United States Patent [19]

Hartog et al.

[11] 4,448,818
[45] May 15, 1984

[54] METHOD AND APPARATUS FOR APPLYING LIQUID TO A MOVING SURFACE

[75] Inventors: Stefan Hartog, Bromma; Holger Hollmark, Huddinge, both of Sweden

[73] Assignee: Svenska Traforskningsinstitutet, Stockholm, Sweden

[21] Appl. No.: 306,374

[22] Filed: Sep. 28, 1981

Related U.S. Application Data

[63] Continuation-in-part of Ser. No. 154,419, Aug. 30, 1979, abandoned.

[30] Foreign Application Priority Data

Dec. 30, 1977 [SE] Sweden ............................ 7714975

[51] Int. Cl.³ .......................................... B05D 1/02
[52] U.S. Cl. ................................. 427/424; 427/345; 427/421; 118/300; 118/325; 118/326
[58] Field of Search ............... 239/120, 121, 122, 103; 427/345, 421, 424; 118/325, 326, 300

[56] References Cited

U.S. PATENT DOCUMENTS

| | | | |
|---|---|---|---|
| 2,118,212 | 5/1938 | MacLaurin | 91/45 |
| 2,261,212 | 11/1941 | Beregh | 118/300 X |
| 2,488,195 | 11/1949 | Ivey | 427/421 |
| 2,736,289 | 2/1956 | Allen | 118/325 X |
| 3,270,711 | 9/1966 | Leach | 118/326 |
| 3,467,061 | 9/1969 | McHugh | 118/326 |
| 3,926,716 | 12/1975 | Bates | 162/113 |
| 4,020,789 | 5/1977 | Gamurellis | 118/308 |

FOREIGN PATENT DOCUMENTS

| | | |
|---|---|---|
| 2113561 | 9/1972 | Fed. Rep. of Germany . |
| 2526702 | 12/1976 | Fed. Rep. of Germany . |
| 2046705 | 3/1971 | France . |
| 302751 | 7/1968 | Sweden . |
| 383007 | 2/1976 | Sweden . |
| 374536 | 2/1964 | Switzerland . |

Primary Examiner—Shrive P. Beck
Attorney, Agent, or Firm—Stevens, Davis, Miller & Mosher

[57] ABSTRACT

A method of applying liquid in a finely divided form onto a moving surface and an apparatus for carrying out that method. A flow of air containing suspended liquid particles is passed substantially parallel to the moving surface and across its direction of movement within a container which extends across the width of the moving surface. The container has a slit or a series of openings facing the moving surface, through which slit or openings at least a part of the liquid particles entrained in the air flow are deflected and passed substantially normal to the surface to be deposited thereon.

8 Claims, 2 Drawing Figures

METHOD AND APPARATUS FOR APPLYING LIQUID TO A MOVING SURFACE

This application is a continuation-in-part of application Ser. No. 06/154,419 filed Aug. 30, 1979 and now abandoned.

TECHNICAL FIELD

This invention relates to a method and apparatus for applying liquid in a finely divided form to a moving surface, such as a rotating cylinder or a moving web.

BACKGROUND ART

In the paper and other industries, where a web moves with high velocity over rotating cylinders, the axes of which are parallel, there is often a need of affecting the characteristics, of the moving web or the reciprocatory action between the moving web and the cylinders rotating against it (such as friction or adhesion), during the course of the process and usually by small additions of chemicals. There are several methods of this type in practical operation, of which the most customary involve a finely divided liquid being sprayed from one or several jets towards the moving web or a rotating cylinder.

These methods suffer from a number of deficiencies however. If the moving web is wide, several jets are required to be mounted side by side, there are then great difficulties in obtaining a uniform distribution of the finely divided liquid. The more usual types of jet always run the risk of stoppages, giving rise to operational disturbances. Spraying a finely divided liquid in the air is also a sanitary discomfort if effective screening is not arranged.

Alternative methods, developed for various applications, for instance those having a web to pass through a mist chamber, will not show sufficient efficiency at high web velocities because the finely divided liquid particles cannot penetrate the boundary level surrounding the moving web.

Some existing methods fail to meet the requirements of high speed because their design is not suitable for the flow of suspended particles in air at high speed.

A method of applying liquid particles to a rotating cylinder is described in the U.S. Pat. No. 3,926,716 to Bates. This particularly allows a uniform distribution of chemicals over the width where application is to take place. The method does not however permit application of such small amounts of chemicals as is demanded in many cases.

DISCLOSURE OF THE INVENTION

The present invention relates to a method and an apparatus for applying a finely divided liquid on a moving surface such as a rotating cylinder or a moving web, allowing uniform distribution of varying amounts of liquid over the width which is to be treated, in which the jets used can be so mounted that they are easily accessible for cleaning, and can easily, automatically bypass each other, so that possible stoppage in a jet does not result in operational disturbance, and in which the liquid used is enclosed in such a way that leakage of finely divided liquid to the ambient air is minimal. One requirement of the present invention, which is typical for the paper manufacturing process, is that the spray application system must provide an even distribution of liquid particles across the width of the paper web. This is preferably without any structures other than what is disclosed herein and, more specifically, without any device which contacts the moving web.

A troublesome cause of uneven distribution is very often the generation of droplets. It is a self-evident requirement of the present invention that the amount of droplets generated and transferred from the applicator to the moving web must be at a minimum. To obtain this, it is necessary that the stream of air containing suspended liquid particles is kept as undisturbed as possible. Otherwise, condensation of particles on walls and hindrances will increase the amount of droplets as well as reduce the efficiency of the entire system.

Another requirement of the present invention which is typical for paper manufacturing processes is that the spray application system must provide a sufficiently large amount of liquid particles to a web which is moving at a high velocity. The inventors of the system disclosed herein were aware of alternative methods, developed for various applications, for instance those having a web to pass through a mist chamber. However, such methods do not have sufficient efficiency at high web velocities because the finely divided liquid particles cannot penetrate the boundary layer surrounding the moving web. In apparatuses which incorporate a perforated tube to distribute the liquid particles, the system as a whole is essentially a mist chamber, especially when evacuating tubes are located at a considerable distance from the moving web and have their perforations directed away from the web. The allowable speed of a moving sheet in such an apparatus is considerably less than that of the present invention. On the other hand, the spray application system described in the present application has been evaluated on surfaces moving at velocities exceeding 1000 meters per minute.

To produce an even distribution at high web velocities, in the present invention it is important that the system should be designed as a three-phase flow situation, considering the density difference between the liquid particles and the air, which causes the particles to follow different flow paths than the air. The present invention, which satisfies the requirements of an even distribution at high velocities, is based on the principle that the cross-sectional area of the air/particle inlet is substantially larger than the area of the slit or series of openings directed towards the moving web. Thereby are the particles accelerated as they leave the container (element 5) and their agglomeration in the distal end of the container (opposite to the inlet) is prevented.

For these objects the method and apparatus have the characterizing features apparent from the following patent claims.

BRIEF DESCRIPTION OF THE DRAWING

The invention will now be described in detail in conjunction with the drawing, in which.

DETAILED DESCRIPTION OF BEST MODE

Figure 1:
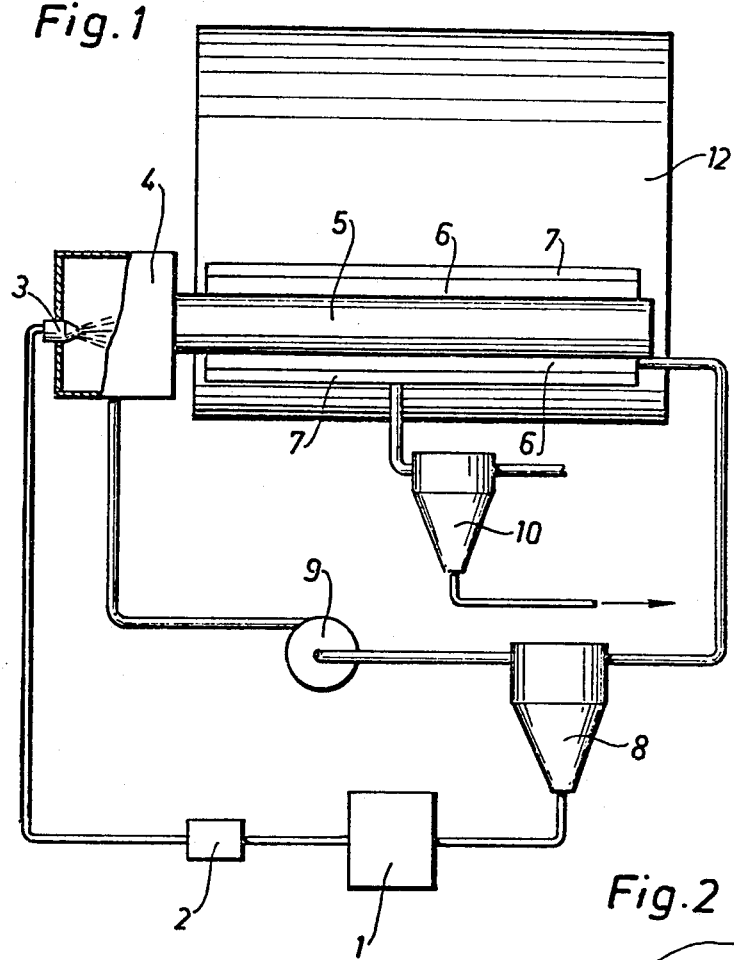
FIG. 1 shows schematically an embodiment of a system with associated equipment for applying liquid to a rotating cylinder.
Figure 2:
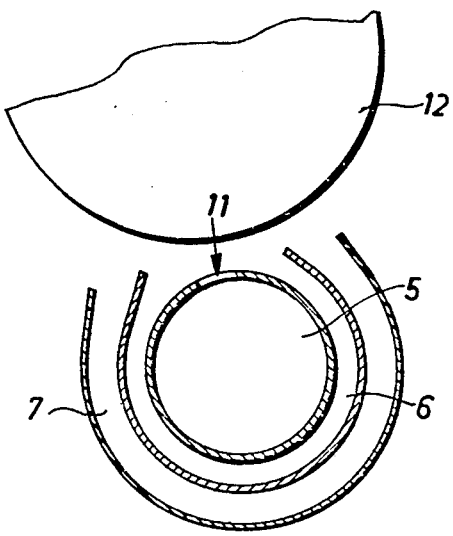
FIG. 2 shows schematically the applying means seen parallel to the axis of the rotating cylinder.

A liquid containing, or constituting, the chemicals intended for use is taken, e.g. by means of a pump 2, from a storage vessel 1 to a jet 3, where the liquid is finely divided while being injected into a mixing chamber 4 for mixing with air supplied by a fan 9. The liquid can be finely divided by types of jet known per se, so that the diameter of the liquid particles is distributed substantially within the range of 5–200 μm.

The liquid and air mixture is then taken with low velocity in order to maintain the particles suspended in air from the mixing chamber 4 to a container 5 extending substantially along the whole length of a rotating cylinder 12. The pressure difference between the mixing chamber and the ambient air is preferably between 10 and 300 mm of water column. The container 5 is provided with a slit or a series of openings 11, facing towards the rotating cylinder (or a web running over it), similarly extending substantially over the entire length of the cylinder (or width of the web). All or a portion of the liquid particles suspended in the air stream will hereby be deflected and accelerated by means of the pressure drop experienced at the slit or series of openings and be given a movement substantially normal to the axis of the rotating cylinder. The cross-sectional area of the container 5 inlet is substantially larger than the total area of the slit or series of openings 11. The particles are finally deposited on the cylinder, or absorbed on or absorbed in the moving web.

A primary trough 6 is mounted round the container, for collecting the particles which are not absorbed or absorbed by the moving web or deposited on the rotating cylinder, a certain amount of air being collected at the same time. The liquid-air mixture from the primary trough 6 is thereafter taken to a separating means 8, for example, this means being known per se and can be a cyclone in which air and liquid are separated. In this embodiment, the air from the primary trough 6 is led from the separating means 8 to the fan 9, for circulation round the system. The liquid separated in the means 8 is recycled to the storage vessel 1, and is thus also caused to circulate in the system.

A secondary trough 7 can be mounted round the primary trough 6, and via a means (similar to the means 8) for separating liquid and solid particles, is in communication with a separate means for generating a partial air vacuum in relation to atmospheric pressure. A certain amount of air from the ambient atmosphere, together with possible foreign particles, will thus intrude between the edges of the secondary trough, mounted round the primary trough, and the surface of the moving web or the rotating cylinder. Leakage of liquid particles can thus be reduced or prevented in this way. The particle-air mixture from the secondary through is thereafter taken to a means 10, for example, this means being an individual separating means, known per se, in which particles and air are separated.

In other embodiments, the secondary trough 7 can be dispensed with, and the primary trough 6 connected to the separate means for generating a partial vacuum, or directly to the fan 9.

Finally, the container 5 is mounted in such a way that it is pivotable about an axis substantially parallel to that of the rotating cylinder axis. In this way, the angle between the flow direction of the particles emerging from the slit or openings 11 and the plane or tangential plane of the moving web or the tangential plane of the rotating cylinder can be varied.

Due to the pivotability of the container 5, and depending on the position of the slit or openings 11 in the container in relation to one edge of the primary trough 6, it is possible to vary the number of liquid particles which are absorbed or adsorbed by the moving web or are deposited on the rotating cylinder, in relation to the number of liquid particles collected in the primary trough 6 and recycled to the system. Due to the pivotability of the container 5, the method according to the present invention thus allows a possibility of regulating the amount of applied chemical further to those allowed by constricting the liquid flow between the storage vessel 1 and the jet 3 or by manipulating the jet 3.

I claim:

1. A method of applying liquid in a finely divided form onto a moving surface comprising:
    positioning an elongated container substantially parallel to and extending transversely across the width of a surface which is mounted for movement, said container having an inlet and an outlet in the form of a slit or series of openings facing the surface, with the cross-sectional area of the inlet being substantially larger than the total area of the slit or openings;
    passing a stream of air containing suspended liquid particles into said inlet so that said stream is substantially parallel to the surface;
    increasing the velocity of the air-liquid stream as it emerges from said slit or openings due to the smaller cross-sectional area thereof, at least a part of the liquid particles being deflected and passing substantially normal to said surface to be deposited thereon.

2. Apparatus for applying liquid in a finely divided form onto a moving surface comprising:
    means for moving said surface past an area for liquid application thereto;
    an elongated container at said area of liquid application, said container being mounted to be substantially parallel to but spaced away from said surface and extending transversely across the width of said surface;
    apparatus for introducing a stream of air having suspended liquid particles into said container in a direction substantially parallel to said surface;
    said container having an outlet comprising a slit or series of openings facing toward the surface and an inlet of substantially larger cross-sectional area than the total area of said outlet so that the air-liquid emerging from said slit or series of openings increases in velocity.

3. The apparatus of claim 2, including a primary trough of similar cross-sectional shape as the elongated container and mounted about said elongated container and extending along substantially the entire length of the container and spaced therefrom, said primary trough having edges closer to said surface than said container, said edges defining an opening generally concentric with said slit or openings to receive liquid particles from said container which are not deposited on said surface;
    separation means connected to said primary trough to separate out the liquid particles from said primary trough and conduit means feeding said liquid back to said apparatus for introducing said air-liquid.

4. The apparatus of claim 3, including a secondary trough mounted about the primary trough and extending along substantially the entire length thereof and spaced therefrom, said secondary trough having edges extending toward said surface, said edges defining an opening generally concentric with that of said primary trough.

5. The apparatus of claims 3 or 4, including means for generating a partial vacuum connected to said trough so that ambient air intrudes between the edges of the trough and the surface so as to facilitate return of liquid particles to the trough.

6. The apparatus of claims 4 or 5 in which the container is pivotally mounted about an axis substantially parallel to the plane of the surface so that the angle between the flow direction of the liquid particles coming from the slit or openings and the surface can be varied.

7. The apparatus of claim 2 in which the container is positioned beneath the surface.

8. Apparatus for applying liquid in a finely divided form onto a moving surface comprising:

means for moving said surface past an area for liquid application thereto;

an elongated container at said area of liquid application, said container being mounted substantially parallel to but spaced away from said surface and extending transversely across the width of said surface;

a mixing chamber at one end of said container housing a jet connected to a source of liquid under pressure, said chamber being connected to air pressure and positioned to introduce a stream of air having suspended liquid particles into an outlet end of said container and along the length thereof in a direction substantially parallel to said surface;

said container having an outlet comprising a slit or series of openings facing toward the surface, the total cross-sectional area of said outlet being substantially smaller than the cross-sectional area of said inlet so that the air-liquid emerging from said outlet increases in velocity;

a primary trough about the container and spaced therefrom to define an open area therebetween, said trough having an oblong opening with edges closer to said surface than said container, said oblong opening being generally concentric with said slit or openings so as to receive liquid particles from said container which are not deposited on said surface;

separation means connected to said trough to receive and separate out the liquid particles from said trough and conduit means feeding said liquid back to said liquid source for subsequent recirculation.

* * * * *